2,960,540

PROCESS OF PREPARING 2-ISOBUTYL-1,5-PENTANEDIOL

Kent C. Brannock, Kingsport, Tenn., assignor to Eastman Kodak Company, Rochester, N.Y., a corporation of New Jersey No Drawing. Filed Nov. 2, 1959, Ser. No. 850,051

2 Claims. (Cl. 260—635)

This invention relates to a process of making 2-alkyl-1,5-pentanediols, in which the alkyl group in the 2-position is a branched-chain group. This application is a continuation-in-part of my copending application Serial No. 742,747, filed June 18, 1958, now abandoned.

I have found that aliphatic aldehydes react with dihydropyran, in the presence of boron trifluoride, to give good yields of 2,4-dialkylhexahydropyrano-[2.3-d]-m-dioxins. I have further found that when the starting aldehyde is a branched-chain aldehyde, the 2,4-dialkylhexahydropyrano-[2.3-d]-m-dioxin formed can be hydrolyzed by refluxing with acetic acid in the presence of a catalytic amount of an acid selected from the group consisting of mineral acids and strong organic acids having ionization constants of at least $1 \times 10^{-2}$, to give 2-alkenyl-5-acetoxy-valeraldehyde, which can be hydrogenated to the corresponding 2-alkyl-1,5-pentanediol monoacetate. Saponification of the 2-alkyl-1,5-pentanediol monoacetate gives 2-alkyl-1,5-pentanediol. My invention is illustrated, but not limited, by the following examples.

*Example 1.*—A mixture of 317 g. (4.4 moles) of dry isobutyraldehyde and 168 g. (2 moles) of dihydropyran was added dropwise over a period of 1¼ hours to a stirred solution of 0.5 ml. of boron trifluoride-etherate in 20 ml. of ether. Slight cooling was used to maintain the temperature at 50–55° C. The mixture was stirred for an additional 2¾ hours, after which a solution of 10 g. of potassium acetate in 10 ml. of water was added and the whole vigorously stirred for 10 minutes. The organic phase was separated and distilled at atmospheric pressure, resulting in the removal of 66 g. of isobutyraldehyde. Distillation of the residue in vacuo gave 66 g. of isobutyraldehyde trimer, B.P. 88° C. at 12 mm., M.P. 61° C., and 271 g. (a 59.4% yield) of 2,4-diisopropyl hexahydropyrano-[2.3-d]-m-dioxin, B.P. 128° C. at 12 mm., $n_D^{20}$ 1.4562, and 72.5 g. of residue.

200 g. of 2,4-diisopropyl hexahydropyrano-[2.3-d]-m-dioxin was mixed with 100 g. of acetic acid, 50 ml. of toluene, and 0.2 g. of p-toluenesulfonic acid. The mixture was heated under reflux for 2½ hours and then distilled under a column, 53 g. of isobutyraldehyde-water azeotrop being removed at 60–65° C. When no more isobutyraldehyde came over, the residue was refluxed under a Dean-Stark trap for 2 hours. 22 ml. of water layer was removed. The toluene and excess acetic acid were removed by distillation in vacuo, heating the residue to 80° C. under 10 mm. pressure. The residue was dissolved in 250 ml. of ethyl acetate. This solution was subjected to hydrogenation for four hours at 150° C. and 1500 p.s.i. over Raney nickel. The catalyst was removed by filtration, and the ethyl acetate was removed by distillation, heating to 130° C. at 150 mm. The residue, crude 5-acetoxy-2-isobutyl-1-pentanol, was saponified and distilled to give 9 g. of forerun, B.P. 50–115° C. at 2–3 mm., and 87 g. (a 62% yield) of 2-isobutyl-1,5-pentanediol, B.P. 115–121° C. at 2–3 mm., $n_D^{20}$ 1.4579.

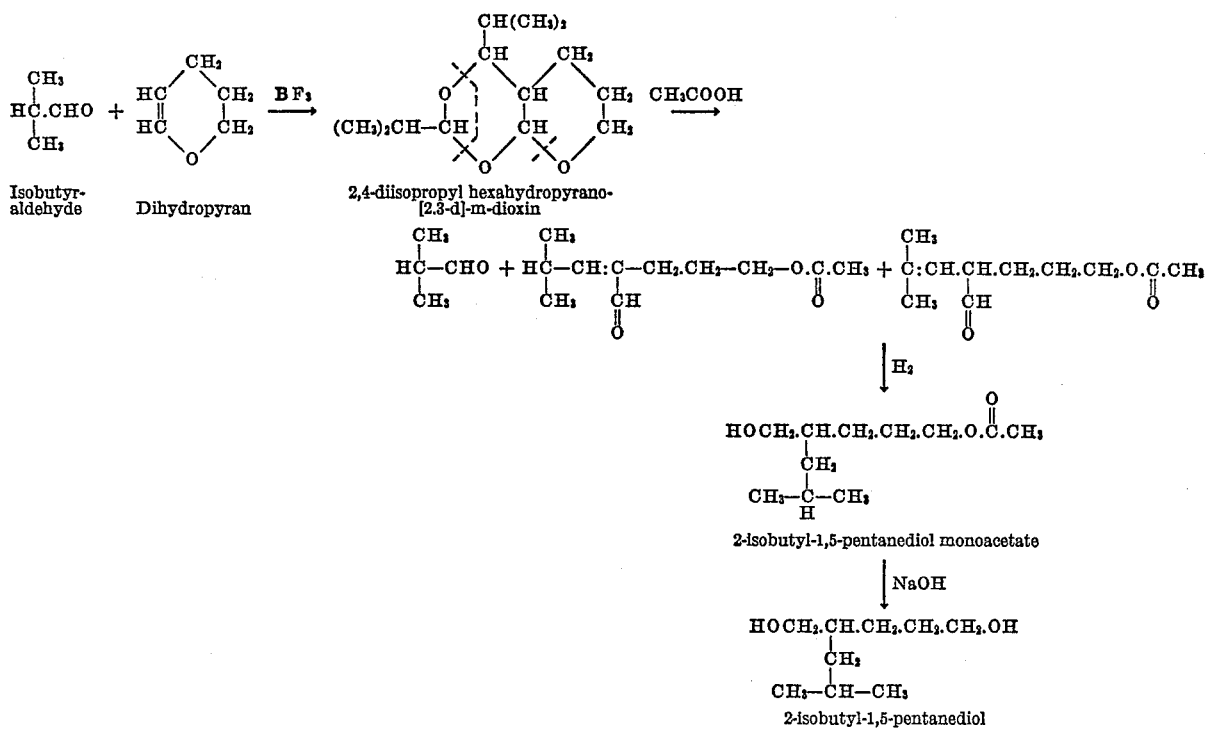

*Example 2.*—The process described in the second portion of Example 1 was repeated, except that 0.2 g. of concentrated sulfuric acid was substituted for the 0.2 g. of p-toluenesulfonic acid. Workup as in Example 1 gave 79 g. of 2-isobutyl-1,5-pentanediol.

*Example 3.*—The process described in the second half of Example 1 was repeated, except that the catalyst used was 5 g. of potassium acid sulfate. Workup gave 78 g. of 2-isobutyl-1,5-pentanediol.

*Example 4.*—Similarly, using 0.5 g. of 87% phosphoric acid as catalyst, 72 g. of 2-isobutyl-1,5-pentanediol was obtained.

*Example 5.*—Similarly, using 0.25 g. of trifluoroacetic acid as catalyst, 83 g. of 2-isobutyl-1,5-pentanediol was obtained.

*Example 6.*—Similarly, the use of 0.75 g. of trichloroacetic acid as catalyst gave 88 g. of 2-isobutyl-1,5-pentanediol.

When the starting aldehyde is a straight-chain aldehyde, a 2,4-dialkylhexahydropyrano-[2.3-d]-m-dioxin is formed, but refluxing with acetic acid does not lead to the formation of a 2-alkly-1,5-pentanediol.

A mixture of 288 g. (4 moles) of n-butyraldehyde and 168 g. (2 moles) of dihydropyran was added dropwise over a 30-minute period to a stirred solution of 0.5 ml. of boron trifluoride-etherate in 20 ml. of ether, moderate cooling being used to maintain the temperature at 50–55° C. The catalyst was neutralized by stirring with a solution of 10 g. of potassium acetate in 20 ml. of water. Distillation of the organic phase gave 269 g. (a 59% yield) of 2,4-dipropyl-hexahydropyrano [2.3-d]-m-dioxin, B.P. 115–121° C. at 4–5 mm., $n_D^{20}$ 1.4578. However, repetition of the subsequent steps of Example 1 gave only high-boiling, viscous products from which no pure compounds could be separated.

The 2-alkyl-1,5-pentanediols are useful in the manufacture of plastic polyesters. Some of their carboxylic acid esters are useful as plasticizers and as synthetic lubricants.

I claim:
1. A process of preparing 2-isobutyl-1,5-pentanediol, which comprises hydrolyzing with acetic acid, in the presence of a catalytic amount of an acid selected from the group consisting of mineral acids and strong organic acids having ionization constants of at least $1 \times 10^{-2}$, 2,4-diisopropyl hexahydropyrano [2.3-d]-m-dioxin, having the formula

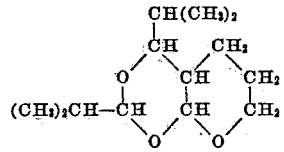

hydrogenating the reaction product to give 2-isobutyl-1,5-pentanediol monoacetate, and saponifying the 2-isobutyl-1,5-pentanediol monoacetate.

2. A process of preparing 2-isobutyl-1,5-pentanediol, which comprises hydrolyzing with acetic acid, in the presence of a catalytic amount of p-toluenesulfonic acid, 2,4-diisopropyl hexahydropyrano [2.3-d]-m-dioxin, having the formula

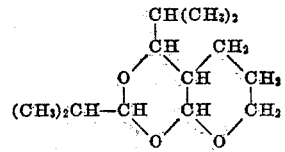

hydrogenating the reaction product to give 2-isobutyl-1,5-pentanediol monoacetate, and saponifying the 2-isobutyl-1,5-pentanediol monoacetate.

No references cited.